US010215110B2

(12) United States Patent
Okamoto

(10) Patent No.: US 10,215,110 B2
(45) Date of Patent: Feb. 26, 2019

(54) CONTROLLER FOR HYBRID VEHICLE

(71) Applicant: DENSO CORPORATION, Kariya, Aichi-pref. (JP)

(72) Inventor: Tsuyoshi Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 849 days.

(21) Appl. No.: 14/243,142

(22) Filed: Apr. 2, 2014

(65) Prior Publication Data
US 2014/0297083 A1 Oct. 2, 2014

(30) Foreign Application Priority Data

Apr. 2, 2013 (JP) ................................. 2013-076568

(51) Int. Cl.
| B60W 10/06 | (2006.01) |
| F02D 29/02 | (2006.01) |
| B60W 10/08 | (2006.01) |
| B60W 10/26 | (2006.01) |
| B60W 10/30 | (2006.01) |
| B60W 30/188 | (2012.01) |
| B60W 20/10 | (2016.01) |
| B60H 1/00 | (2006.01) |
| B60W 50/00 | (2006.01) |

(52) U.S. Cl.
CPC ............. *F02D 29/02* (2013.01); *B60H 1/004* (2013.01); *B60W 10/06* (2013.01); *B60W 10/08* (2013.01); *B60W 10/26* (2013.01); *B60W 10/30* (2013.01); *B60W 20/10* (2013.01); *B60W 30/1882* (2013.01); *B60W 2050/0094* (2013.01); *B60W 2510/0676* (2013.01); *B60W 2510/244* (2013.01); *Y02T 10/6286* (2013.01); *Y10S 903/903* (2013.01)

(58) Field of Classification Search
CPC ...... B60H 1/00428; B60K 6/28; B60K 6/365; B60W 10/06
USPC .......................... 701/22; 180/165; 290/40 C
See application file for complete search history.

(56) References Cited

U.S. PATENT DOCUMENTS

| 5,841,201 | A | * | 11/1998 | Tabata | .................... | B60K 6/365 |
| | | | | | | 290/400 |
| 5,934,089 | A | | 8/1999 | Nakagawa et al. | | |
| 6,158,541 | A | * | 12/2000 | Tabata | ..................... | B60K 6/28 |
| | | | | | | 180/165 |
| 6,253,866 | B1 | | 7/2001 | Kojima | | |
| 2013/0020045 | A1 | * | 1/2013 | Hashigaya | ......... | B60H 1/00428 |
| | | | | | | 165/11.1 |
| 2013/0166121 | A1 | | 6/2013 | Takeuchi et al. | | |
| 2015/0217756 | A1 | * | 8/2015 | Kitabatake | ............ | B60W 10/06 |
| | | | | | | 701/22 |

FOREIGN PATENT DOCUMENTS

| JP | 2009-029386 | 2/2009 |
| JP | 2009-029388 | 2/2009 |

* cited by examiner

*Primary Examiner* — Thomas G Black
*Assistant Examiner* — Wae L Louie
(74) *Attorney, Agent, or Firm* — Nixon & Vanderhye P.C.

(57) ABSTRACT

According to a temperature of an engine, a state-of-charge of a battery, a requirement of instruments and a driver's requirement, an engine control is switched between a first engine control and a second engine control. In the first engine control, an electric power is firstly used for a vehicle-driving prior to other functions. In the second engine control, the electric power is firstly used for functions other than the vehicle-driving.

7 Claims, 6 Drawing Sheets

CONTROLLER FOR HYBRID VEHICLE

CROSS-REFERENCE TO RELATED APPLICATION

This application is based on Japanese Patent Application No. 2013-76568 filed on Apr. 2, 2013, the disclosure of which is incorporated herein by reference.

TECHNICAL FIELD

The present disclosure relates to a controller for a hybrid vehicle having an engine and an electric motor as power source.

BACKGROUND

A hybrid vehicle has been developed to reduce emission and improve fuel economy. Japanese Patent No. 3305974 (U.S. Pat. No. 5,934,089) shows an air conditioning system for a hybrid vehicle. When a temperature of an air cooled by an evaporator is less than or equal to a specified value with the vehicle stopped, an internal combustion engine is not started. When the temperature of an air cooled by an evaporator is greater than the specified value, the internal combustion engine is started to drive a compressor of the air conditioning system.

Generally, in a control system of a hybrid vehicle, an engine power is determined based on a vehicle-driving power which the hybrid vehicle needs. A surplus power is used for driving an air conditioning system. However, in such a control system of a hybrid vehicle, when a vehicle-driving load is not high, it is likely that a thermal energy (heat quantity of engine coolant) for a heater system may run short.

Also, in another control system of a hybrid vehicle, an internal combustion engine generates energy for both of vehicle-driving and air-conditioning. However, in such a control system of a hybrid vehicle, when a vehicle-driving load is high, it is likely that an operating point of the internal combustion engine is brought into an outside of an area where the engine is operated efficiently. As a result, fuel economy may be deteriorated.

In a hybrid vehicle, since the internal combustion engine is intermittently driven, a thermal energy of the engine coolant easily runs short for a heating. Thus, it is necessary to generate the thermal energy only for a heating. Alternatively, it is necessary to generate an electric power for turning on an electric heater.

Even in the air conditioning system for a hybrid vehicle shown in Japanese Patent No. 3305974 (U.S. Pat. No. 5,934,089), the above described matters cannot be avoided.

SUMMARY

It is an object of the present disclosure to provide a controller for a hybrid vehicle, which is able to restrict a shortage of a power which is used for other than a vehicle-driving while restricting deterioration in fuel economy.

According to the present disclosure, a hybrid vehicle has an internal combustion engine, an electric motor, an alternator driven by the internal combustion engine, and a battery. A controller has a control unit which changes a priority of an energy supply between a vehicle-driving and an instrument in the hybrid vehicle according to at least one of a temperature of the internal combustion engine, a state of charge of the battery, a requirement from the instrument, and a requirement from a driver of the hybrid vehicle.

In a first engine control, an electric power is firstly used for a vehicle-driving prior to other functions. In a second engine control, the electric power is firstly used for functions other than the vehicle-driving. According to a state of the vehicle, the engine output power can be properly used for driving the vehicle and for operating the instruments in the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An embodiment will be described hereinafter.

Figure 1:
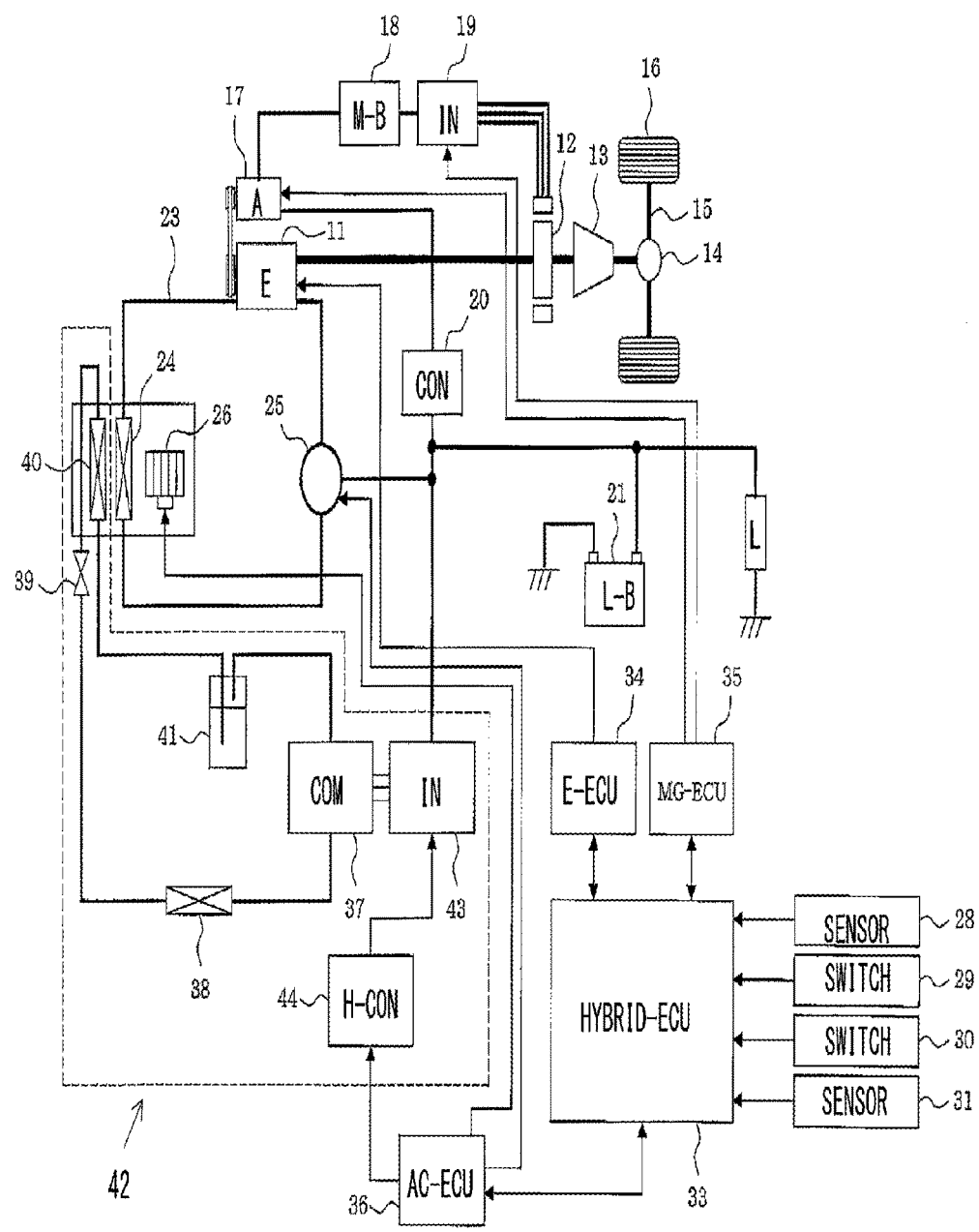
FIG. 1 is a schematic view showing a control system of a hybrid vehicle according to an embodiment.

Referring to FIG. 1, a control system for a hybrid vehicle will be explained hereinafter. The hybrid vehicle is equipped with an internal combustion engine 11 and a motor-generator (MG) 12. A power of an output shaft (crankshaft) of the engine 11 is transferred to the transmission 13 through the MG 12. The power of the output shaft of the transmission 13 is transferred to wheels 16 through a differential gear mechanism 14 and axles 15. The transmission 13 may be a continuously variable transmission (CVT).

A shaft of the MG 12 is connected to the engine 11 and the transmission 13. A clutch (not shown) may be provided between the engine 11 and the MG 12.

An alternator 17 is driven by the engine 11 to generate electric power. A main battery 18 is charged with the generated electric power. An inverter 19 driving the MG 12 is connected to the main battery 18, so that the electric power is delivered between the MG 12 and the main battery 18 through the inverter 19. The alternator 17 is connected to a low-voltage battery 21 through a DC-DC converter 20. Each of the main battery 18 and the low-voltage battery 21 can be charged and discharged.

The hot-water circuit 23 for a heating is fluidly connected to a coolant passage (not shown) of the engine 11. The hot-water circuit 23 includes a heater core 24 and an electric water pump 25 for the heating. The electric water pump 25 is driven by the electric power supplied from the low-voltage battery 21, so that the engine coolant of high temperature is circulated between the engine 11 and the heater core 24.

An air-conditioning system 42 is provided with an electric compressor 37, a condenser 38, an expansion valve 39, an evaporator 40 and an accumulator 41. The electric compressor 37 compresses gas refrigerant of low-temperature low-pressure. The compressed gas refrigerant of high temperature high pressure flows into the condenser 38 in which the compressed gas refrigerant and an air perform a heat exchange therebetween, so that the gas refrigerant becomes liquid refrigerant of high pressure. The expansion valve 39 performs a pressure reduction so that the liquid refrigerant of high-pressure becomes the liquid refrigerant of low-temperature low-pressure. The liquid refrigerant flows into an evaporator 40 in which the liquid refrigerant and an air perform a heat exchange therebetween, so that the liquid refrigerant becomes the gas refrigerant of low-temperature low-pressure. The accumulator 41 stores un-evaporated liquid refrigerant therein. Only gas refrigerant is supplied to the electric compressor 37 from the accumulator 41.

The electric compressor 37 is connected to the low-voltage battery 21 through a second inverter 43. An A/C-ECU 36, which will be described later, controls a heat-pump controller 44. The heat-pump controller 44 controls the second inverter 43 to drive the electric compressor 37. In the vicinity of the heater core 24 and the evaporator 40, a blower fan 26 is arranged.

An accelerator position is detected by an accelerator sensor 28. A gear position of the transmission 13 is detected by a shift switch 29. Furthermore, a brake operation is detected by a brake switch 30, and a vehicle speed is detected by a vehicle speed sensor 31.

A hybrid-ECU 33 is a computer which controls the whole of the vehicle based on signals transmitted from the above sensors and switches. The hybrid-ECU 33 transmits and receives control signals and data signals between an engine-ECU 34, an MG-ECU 35 and the A/C-ECU 36. The engine-ECU 34 controls the engine 11. The MG-ECU 35 controls the inverter 19 and the alternator 17. The A/C-ECU 36 controls the air-conditioning system 42.

In a case that the air-conditioning system 42 is operated, if the engine output power is determined in view of a vehicle-driving only, the thermal energy of the engine coolant for a heater system may run short and the internal combustion engine is started in a compulsory manner. Also, when the electric power is necessary to operate the air-conditioning system 42, it is likely that an operating point of the engine 11 is brought into an outside of an area where the engine 11 is operated efficiently, which causes the deterioration in fuel economy.

Figure 2:
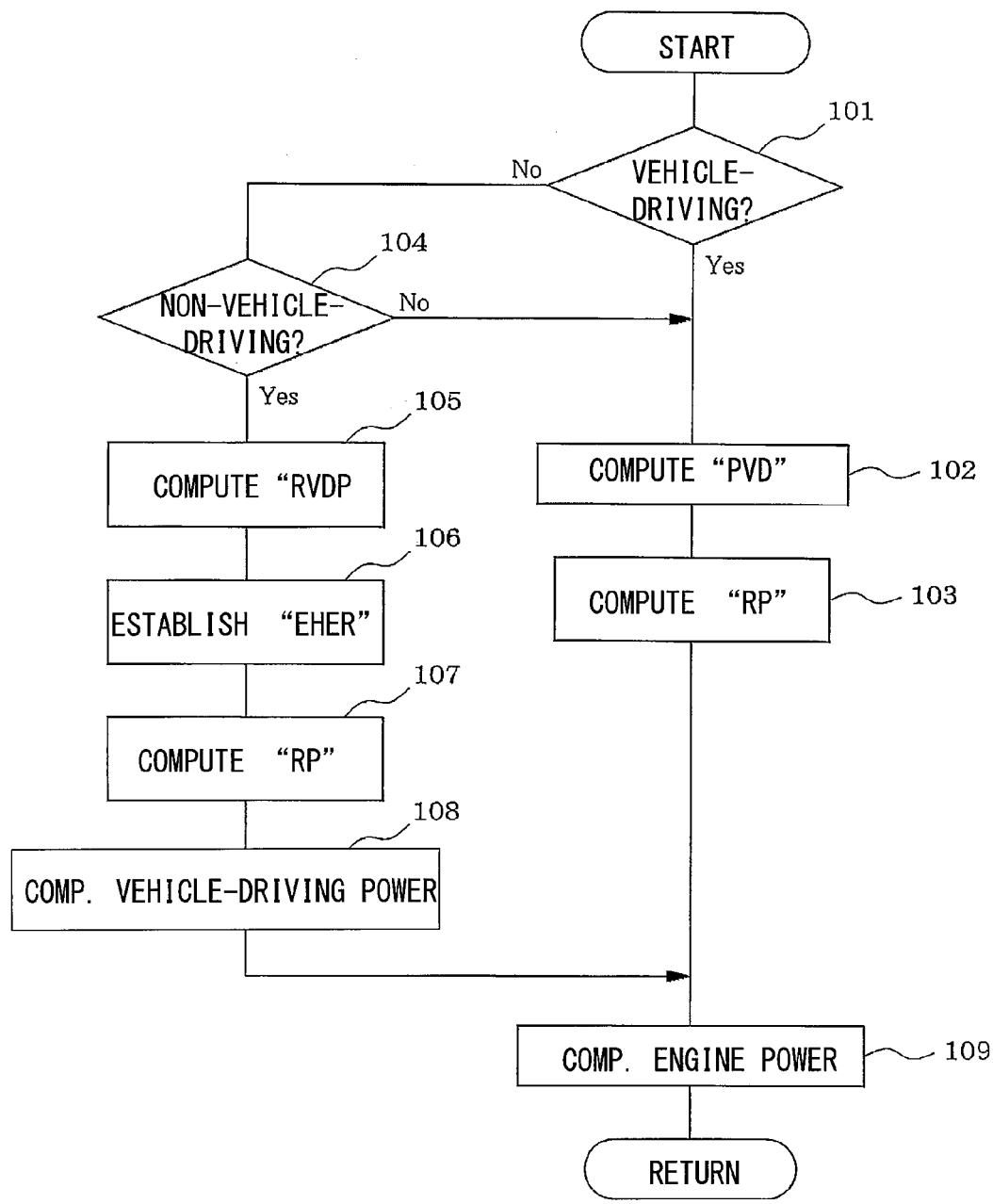
FIG. 2 is a flow chart showing a processing of an engine control routine.

According to the present embodiment, the hybrid-ECU 33 executes an engine control routine shown in FIG. 2. A priority of the energy supply is changed based on at least one of a temperature of the engine 11, a state-of-charge (SOC) of the batteries 18, 21, a requirement of instruments in the vehicle and a driver's requirement. That is, it is determined whether the electric power is firstly used for a vehicle-driving or the electric power is firstly used for other functions, such as air-conditioning.

Thereby, according to the temperature of the engine 11, the state-of-charge (SOC) of the batteries 18, 21, the requirement of instruments (for example, the air-conditioning system) and a driver's requirement (for example, accelerator position), the engine control is switched between a first engine control and a second engine control. In the first engine control, the electric power is firstly used for a vehicle-driving prior to other functions. In the second engine control, the electric power is firstly used for functions other than the vehicle-driving.

The engine control routine shown in FIG. 2 is executed at a specified time interval while the hybrid-ECU 33 is energized. In step 101, the ECU 33 determines whether the vehicle-driving has a priority.

For example, it is determined whether the vehicle-driving has a priority based on whether an accelerator position is over a specified position.

When the answer is YES in step 101, the procedure proceeds to step 102 in which a power for the vehicle-driving is computed. The power necessary for driving the vehicle is referred to as PVD, hereinafter. For example, when a cruise control is not performed, the PVD is computed based on the accelerator position. When the cruise control is performed, the PVD is computed based on the distance from a preceding vehicle and a vehicle speed.

Then, the procedure proceeds to step 108 in which a requirement power RP other than the PVD is computed. For example, the RP is used for air-conditioning. Based on a target temperature in a passenger compartment, blower airflow and an to air-conditioning switch of the air-conditioner, the RP is computed. The RP includes a required electrical power and a required thermal energy.

Moreover, based on a battery SOC (SOC of the main battery 18 and SOC of the low-voltage battery 21), an electric power consumption of the MG 12, and an electric power consumption of auxiliary components driven by an engine (for example, a light, an electric windshield wiper, an audio, a car navigation) other than the air-conditioner, the required electrical energy is computed.

Furthermore, the requirement thermal energy is computed based on the temperature information of the MG 12, the batteries 18, 21, and a catalyst (not shown).

Then, the procedure proceeds to step f in which an engine output power is obtained by adding the RP to the PVD. The engine 11 is controlled to obtain the above engine output power.

When the answer is NO in step 101, the procedure proceeds to step 1 in which it is determined whether functions other than the vehicle-driving has a priority.

For example, it is determined whether functions other than the vehicle-driving has a priority (non-vehicle-driving priority) based on whether the engine coolant temperature or the battery SOC (SOC of the battery 18 and SOC of the battery 21) is lower than a specified threshold. The specified threshold is established based on the current coolant temperature, the current battery SOC, and the energy consumption of the auxiliary components. Alternatively, based on the target temperature in the passenger compartment, the blower airflow and the air-conditioning switch of the air-conditioner, it is determined whether functions other than the vehicle-driving has a priority (non-vehicle-driving priority). When the answer is NO in step 104, the procedure proceeds to step 102.

When the answer is YES in step 104, the procedure proceeds to step 105. In step 105, a range where a vehicle-driving power can be established is computed. The computed range is referred to as an RVDP, hereinafter.

For example, an upper limit of variation in acceleration is established according to at least one of the current accelerator positions, the current vehicle speed and the current acceleration. The RVDP is computed so that the variation in acceleration become lower than or equal to the upper limit. For example, the RVDP is computed so that the variation in acceleration is less than or equal to 0.1G when the vehicle speed is 60-km/h. It should be noted that the RVDP may be set wider when the cruise control is performed.

Figure 3:
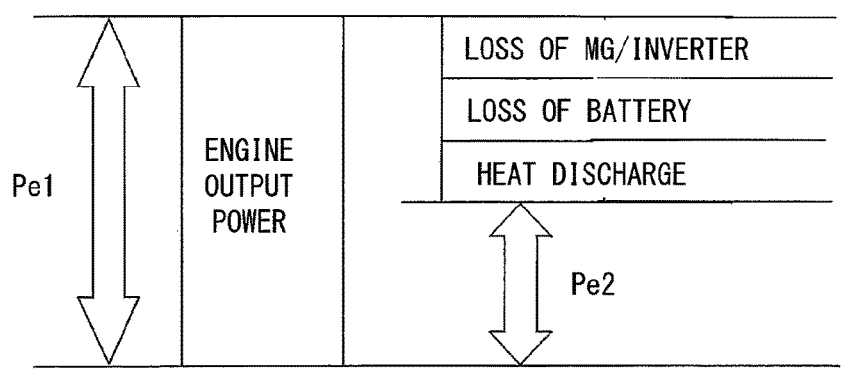
FIG. 3 is a chart for explaining a computation method of an effective-engine-power Pe2.
Figure 4:
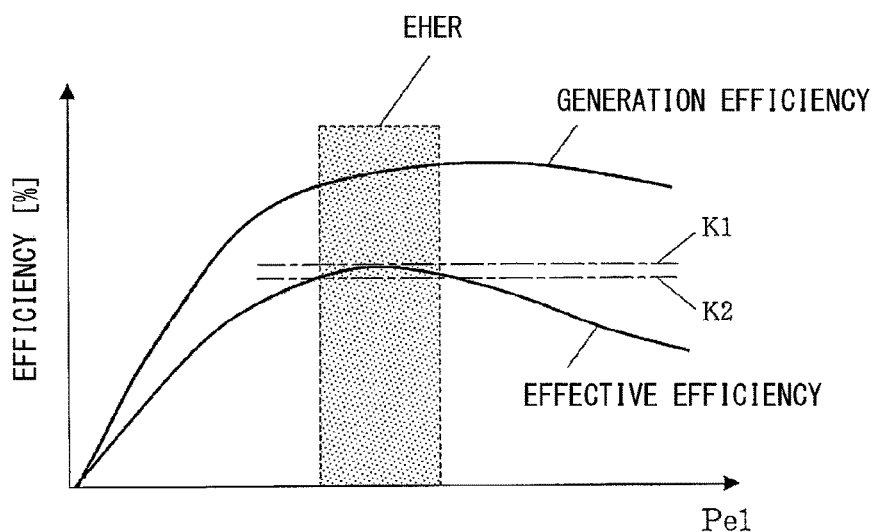
FIG. 4 is a chart for explaining an establishing method of an engine-high-efficiency range.

Then, the procedure proceeds to step 106 in which an engine-high-efficiency range (EHER) is established. In the EHER, a maximum value of the efficiency of the whole system exists. The whole system includes the engine 11, the MG 12, the alternator 17, the batteries 18, 21. For example, as shown in FIG. 3, an effective-engine-power Pe2 is computed by subtracting the lost energy from the generated-engine-power Pe1. The lost energy corresponds to the losses of the MG 12, the alternator 17, the inverter 19 and the batteries 18, 21, and heat discharge. Then, as shown in FIG. 4, the engine-high-efficiency range EHER is defined. In the EFER, the effective efficiency derived from the effective-engine-power Pe2 is greater than or equal to a specified value K2. In FIG. 4, "K1" indicates a maximum value of the effective efficiency. The generation efficiency and the effective efficiency can be obtained according to the following formulas.

Generation efficiency [%]=Generated-engine-power
Pe1 [kW]/Consumed fuel calorie [kW]×100

Effective efficiency [%]=Effective-engine-power Pe2
[kW]/Consumed fuel calorie [kW]×100

Then, the procedure proceeds to step 107 in which the required power RP other than the PVD is computed. For example, the RP is used for air-conditioning.

Then, the procedure proceeds to step 108 in which the vehicle-driving power is computed so that the engine power is in the engine-high-efficiency range EHER. Thereby, the engine output power is divided to the power necessary for driving the vehicle PVD and the required power RP in such a manner that the engine output power is in the engine-high-efficiency range EHER.

[Only Electric Power is Required]

Figure 5:
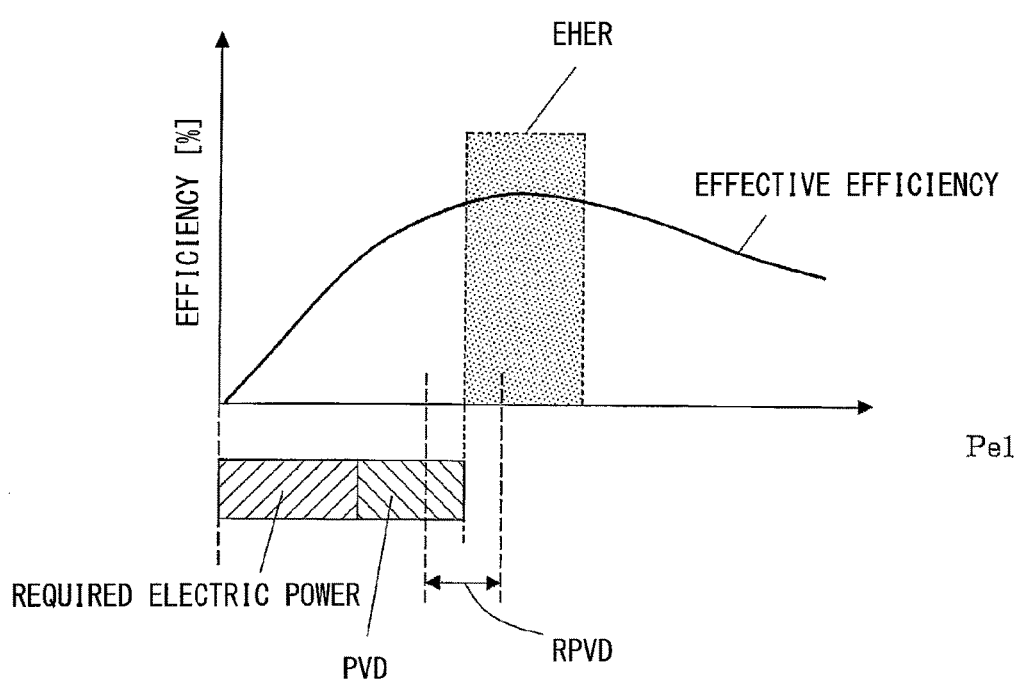
FIG. 5 is a chart for explaining an establishing method of a vehicle-driving power in a case that an electric power is required.

When the required power RP is only an electrical power, a generating electric power is computed to obtain the required electrical power in a specified time period. Then, the vehicle-driving power is adjusted in the RPVD so that the engine output power is brought into the engine-high-efficiency range EHER. The engine output power is obtained by adding the generating electric power to the vehicle-driving power, as shown in FIG. 5.

[Only Thermal Energy is Required]

Figure 6:
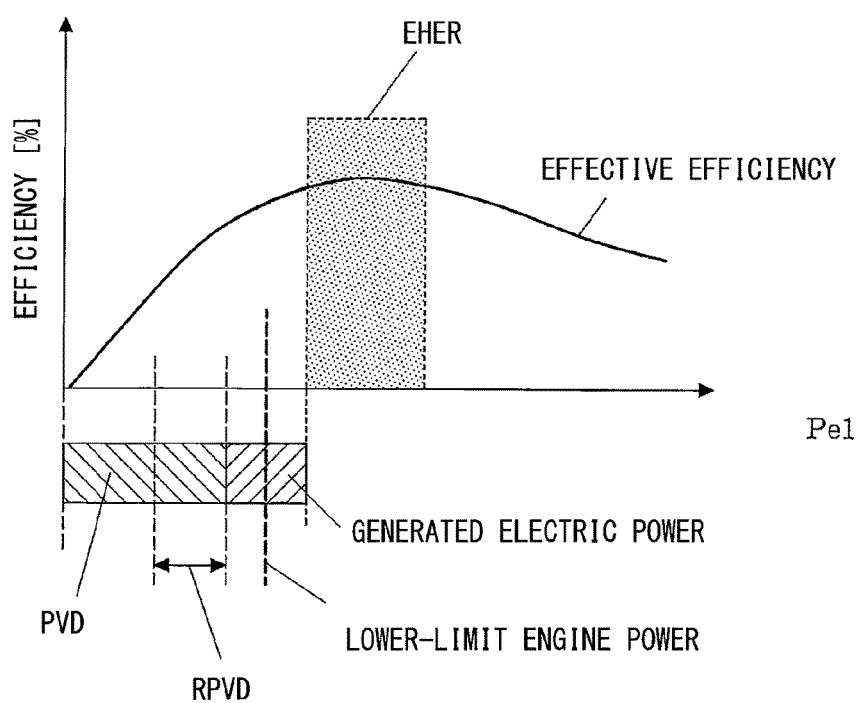
FIG. 6 is a chart for explaining an establishing method of a vehicle-driving power in a case that a thermal energy is required.

As shown in FIG. 6, when the required power RP is only a thermal energy, a lower-limit engine output is computed to obtain the required thermal energy in a specified period. Then, the engine output power (vehicle-driving power PVD) is adjusted to be greater than the lower-limit engine output and within the engine-high-efficiency range EHER. If the engine output power is not brought in the engine-high-efficiency range EHER, the generated electric power is added to the vehicle-driving power PVD.

[Electric Power & Thermal Energy are Required]

Figure 7:
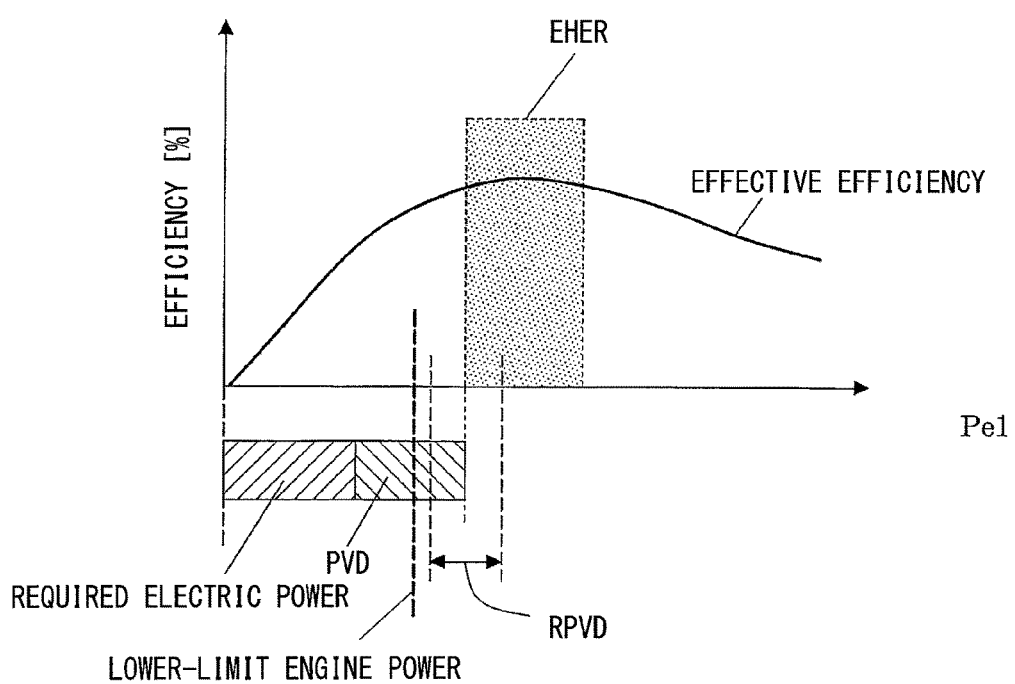
FIG. 7 is a chart for explaining an establishing method of a vehicle-driving power in a case that an electric power and a thermal energy are required.

When the required power RP is the electrical power and the thermal energy, the required-generating electric power is computed to obtain the required electrical power in a specified time period and a lower-limit engine output is computed to obtain the required thermal energy in a specified period, as shown in FIG. 7. Then, the vehicle-driving power is adjusted in the RPVD so that the engine output power exceeds the lower-limit engine output and is brought into the engine-high-efficiency range EHER.

When the engine output power exceeds the engine-high-efficiency range EHER, the vehicle-driving power is computed so that the engine output power becomes minimum in the RVDP. When the engine output does not reach the engine-high-efficiency range EHER, the vehicle-driving power is computed so that the engine output power becomes maximum in the RVDP.

Then, the procedure proceeds to step 109 in which an engine output power is obtained by adding the required power RP computed in step 107 to the vehicle-driving power PVD computed in 108. The engine 11 is controlled to obtain the above engine output power.

As described above, according to the present embodiment, the priority of the energy supply is changed based on the temperature of the engine 11, a state-of-charge (SOC) of the batteries 18, 21, a requirement of instruments in the vehicle and a driver's requirement. In the first engine control, the electric power is firstly used for the vehicle-driving prior to other functions. In the second engine control, the electric power is firstly used for functions other than the vehicle-driving. According to the state of the vehicle, the engine output power can be properly used for the vehicle-driving and for the operating the instruments in the vehicle. Thus, while the vehicle is driving, a shortage of energy supply to functions (for example, air conditioning) other than the vehicle-driving can be restricted with a restriction of the deterioration in fuel economy.

In a case that the second engine control is performed, if the engine output power is significantly varied relative to the driver's requirement (for example, accelerator position), an adverse effect may occurs in the traveling of the vehicle.

According to the present embodiment, when the second engine control is performed, the RVDP is established according to at least one of the accelerator position, the vehicle speed and the acceleration. Thus, the vehicle-driving power PVD is restricted within the RVDP.

Furthermore, while the cruise control is performed, the RVDP is set wider than usual. Thus, while performing the second engine control, the internal combustion engine 11 can be operated at a more efficient operating point.

Moreover, when performing the second engine control, the engine-high-efficiency range EHER is established. The engine output energy is divided to the vehicle-driving power PVD and the required power RP in such a manner that the engine output power is in the engine-high-efficiency range EHER. Thus, the deterioration in fuel economy can be effectively restricted.

According to the present embodiment, the hybrid-ECU 33 executes an engine control routine shown in FIG. 2. However, other ECU can execute the engine control routine.

The present disclosure is not limited to the hybrid vehicle shown in FIG. 1. The present disclosure can be applied to any kinds of hybrid vehicle.

What is claimed is:

1. A controller for a hybrid vehicle having an internal combustion engine, an electric motor, an alternator driven by the internal combustion engine, and a battery, the controller comprising:
   a control unit which divides an engine output into a vehicle-driving power necessary for driving the hybrid vehicle and a requirement-power other than the vehicle-driving power, and changes a priority of an energy supply of the engine output between the vehicle-driving power and the requirement-power according to a temperature of the internal combustion engine, a state of charge of the battery, a requirement from an instrument in the hybrid vehicle, and/or a requirement from a driver of the hybrid vehicle.

2. A controller according to claim 1, wherein
   when the requirement-power has the priority of the energy supply, the control unit establishes a range where a vehicle-driving power can be established according to an accelerator position, a vehicle speed, and/or an acceleration of the hybrid vehicle.

3. A controller according to claim 2, wherein when the requirement power has the priority of the energy supply, the control unit establishes the range in such a manner as to be wider during a cruise control of the hybrid vehicle.

4. A controller according to claim 1, wherein when the requirement-power has the priority of the energy supply, the control unit establishes an engine-high-efficiency range in which an maximum value of an efficiency of a system exists, the system including the internal combustion engine, the electric motor, the alternator and the battery, and the energy supply is performed so that an engine output power is brought into the engine-high-efficiency range.

5. A controller according to claim 1, wherein:
the requirement-power is used for air-conditioning of the hybrid vehicle.

6. A controller according to claim 1, wherein:
the control unit changes the priority of the energy supply of the engine output between the vehicle-driving power and the requirement-power according to the requirement from the instrument in the hybrid vehicle; and
the instrument is an air conditioning system of the hybrid vehicle.

7. A controller according to claim 1, wherein:
the control unit changes the priority of the energy supply of the engine output between the vehicle-driving power and the requirement-power according to the requirement from the driver of the hybrid vehicle; and
the requirement from the driver of the hybrid vehicle is an accelerator position.

* * * * *